(12) United States Patent
Ferrante et al.

(10) Patent No.: US 6,915,278 B1
(45) Date of Patent: Jul. 5, 2005

(54) LICENSE MANAGEMENT METHOD AND SYSTEM

(75) Inventors: Daniel S. Ferrante, Raleigh, NC (US); Jereminh Matthew Lott, Raleigh, NC (US)

(73) Assignee: Borland Software Corporation, Scotts Valley, CA (US)

(*) Notice: Subject to any disclaimer, the term of this patent is extended or adjusted under 35 U.S.C. 154(b) by 29 days.

(21) Appl. No.: 10/394,809

(22) Filed: Mar. 21, 2003

Related U.S. Application Data

(60) Provisional application No. 60/366,692, filed on Mar. 22, 2002.

(51) Int. Cl.[7] .............................................. G06F 17/60
(52) U.S. Cl. ......................................... 705/59; 380/201
(58) Field of Search ..................... 705/59, 58; 380/201; 713/156, 200–204

(56) References Cited

U.S. PATENT DOCUMENTS 5,093,921 A  *  3/1992  Bevins, Jr. ................... 725/152
5,758,068 A  *  5/1998  Brandt et al. ................ 713/200
5,764,770 A  *  6/1998  Schipper et al. ............. 713/176
5,987,136 A  * 11/1999  Schipper et al. ............. 713/176

FOREIGN PATENT DOCUMENTS

JP         02001005659 A  *  1/2001

OTHER PUBLICATIONS

IBM Technical Disclosure Bulletin; Licensed Internal Code Fix Information Integrity; Oct. 1991; vol. 34.*

* cited by examiner

*Primary Examiner*—Elisca Pierre Eddy
(74) *Attorney, Agent, or Firm*—MacCord Mason PLLC

(57) ABSTRACT

Improved license management system and method for a convertible floating license for software that permit conversion from one license state to a second license state to permit authorized license use and management thereof while the user and/or client computer is alternately connected and disconnected from a network having a server computer and license management software thereon for managing and controlling the authorized use of licensed software to a multiplicity of computers and/or users.

45 Claims, 3 Drawing Sheets

LICENSE MANAGEMENT METHOD AND SYSTEM

This appln claims benefit of Ser. No. 60/366,692 Mar. 22, 2002.

FIELD OF THE INVENTION

The present invention relates generally to data processing systems and, more particularly, to licensing software in data processing systems.

BACKGROUND OF THE INVENTION

Generally, software is licensed for use by a single user or machine or it may be licensed for a predetermined number of users within a given entity. In the latter case, the licenses, which provide authorized use or permission for use on agreed upon terms, which are available for use by a predetermined number of users must be managed in order to prevent unauthorized use of the software by a greater number of users than the authorized predetermined number. Since software developers and companies providing software for commercial use base revenues on the number of licenses authorized and used, license management is a valuable tool for ensuring authorized use and compliance with license terms by the licensee and users of the software.

Typically, software licenses have been managed using a number of license-management techniques, which provide ways of monitoring and controlling authorized software use under licenses, in particular by managing the number of usable instances of software operating at a given time on a given data processing system by users thereon. Unauthorized use is generally based upon the license agreement existing between the software provider and the software user(s); a predetermined number of software copies are permitted for use at any given time in exchange for a fee or royalties paid to the provider by the user.

Conventional software license management techniques generally fall into three categories: (1) user-specific, (2) site-based or node-locked, and (3) floating license management techniques. The second two techniques, site-based or node-locked and floating license management techniques, are generally used on a mutually exclusive basis to manage a predetermined number of authorized licenses for users on a data processing system.

Basically, the site-based or node-locked technique provides for license management by tying a particular license and/or copy of software to a particular computer. As such, each copy of the software for use on a computer includes either a software or hardware mechanism to prevent unauthorized use of the software. Where a software mechanism is used, the software for license management requires the software under license for a given computer to verify with that computer that authorization or license is available for that computer, e.g., using an identification means, such as verification of a unique computer serial number that is specific only to that computer. Alternatively, a hardware mechanism, such as a dongle component, provides for a physical component that must be connected to the computer in order for the software to be used on that computer to function. This technique for software license management for multiple users is physically restrictive in requiring users of particular computers only, which have the software or hardware mechanism that enables use of the software under license.

Also, basically, the floating license technique provides for license management by employing a server computer to manage a predetermined number of licenses for use by client computers connected to the server by a network. Each client computer has access to the software to be used, however, that software is not enabled unless permission to use it has been provided by the server computer. Such permission for use is based upon the number of users presently using the software compared to the number of predetermined, authorized users for that system. When the number of actual users at a given time is less than the maximum number of authorized or licensed users, then permission for additional users is available; when the number of actual users equals the maximum authorized users, then permission is denied at that time. The number of authorized users under a license is monitored by the server computer's receipt of signals or "heartbeats" sent from the client computers connected to the network and using the software under license. Alternatively, the client computers may use the software for a predetermined period of time, at the end of which predetermined period, the user license for a particular client computer expires and another client computer user may use the software for that same predetermined period. Once again, the total number of users at any given time is restricted to the maximum number of users on client computers permitted by the license; management is based upon signaling and/or time-based use during a network connection with the server computer by the client computers. This technique for software license management for multiple users is physicalsoally restrictive in requiring users of computers to be connected to the network in order to use a software under license that is permitted, monitored and controlled by the server computer during the connection to the network.

Thus, the conventional software license management systems and methods do not provide support movement from one computer to another and/or for movement that requires disconnection from a network. In business and use of electronics today, the user is familiar with and prefers to have the convenience of switching between computers and of using laptop or other mobile computers and electronic devices for using software on the go, i.e., moving between locations, traveling by car, train, or airplane, and working while disconnected from a network and reconnecting when back on location with the server computer and the client-server network. It is inconvenient to be unable to continue to use software without having to purchase multiple licenses for each user and client computer, and difficult to manage the licenses by a multiplicity of techniques in order to permit mobility and freedom of use if licenses are available for use as described hereinabove. Furthermore, conventional software license management systems lack the capacity for converting between two mutually exclusive license states for remote connected and selective disconnected use from a network controlling the licenses. Conventional software license management systems and methods lack the capability to address these problems.

Thus, there is a need in the art for a license management system and methods of using same that avoids the foregoing limitations of conventional software license management systems and methods, in particular constraints on physical mechanism or a network connection by a client computer with a license-managing server computer.

SUMMARY OF THE INVENTION

The present invention provides an improved license management system and method that overcomes the limitations of conventional license management systems and methods. More particularly, the present invention provides improved license management systems and methods for a convertible floating license that permit conversion from one license state to a second license state to permit authorized license use and management thereof while the user and/or client computer is alternately connected and disconnected from a network having a managing server computer for managing and controlling the authorized use of licensed software.

In accordance with methods and systems consistent with the present invention, it is one aspect of the present invention to provide a method in a data processing system and network of computers for managing software licenses. The method and system provide for authentication of a user after the user has connected to a server from a remote client computer, checking license availability, and receiving a license.

It is another aspect of the present invention to provide a method and system for permitting a user working on a client computer using a license in a first state to convert to a license in a second state for using the license software while disconnected from the computer network. The method includes the steps of providing a data processing system having a server computer and at least one client computer with a corresponding at least one user, the at least one client computer having an established connection to the server computer; authenticating the user and/or client computer; checking license availability and/or status; and receiving a license in a first state, which is convertible to a second state for using software while disconnected from the network. Additionally, the second state license may be released or checked in by re-establishing a network connection and communicating to the server computer to provide for early termination of the second state license. Also or alternatively, upon reconnection with the server computer by the at least one client computer, the second state license on that client computer may be converted back to a first state license.

Additional implementations are directed to systems and computer devices incorporating the methods described above. It is also to be understood that both the foregoing general description and the detailed description to follow are exemplary and explanatory only and are not restrictive of the invention.

DETAILED DESCRIPTION OF THE INVENTION

Figure 1:
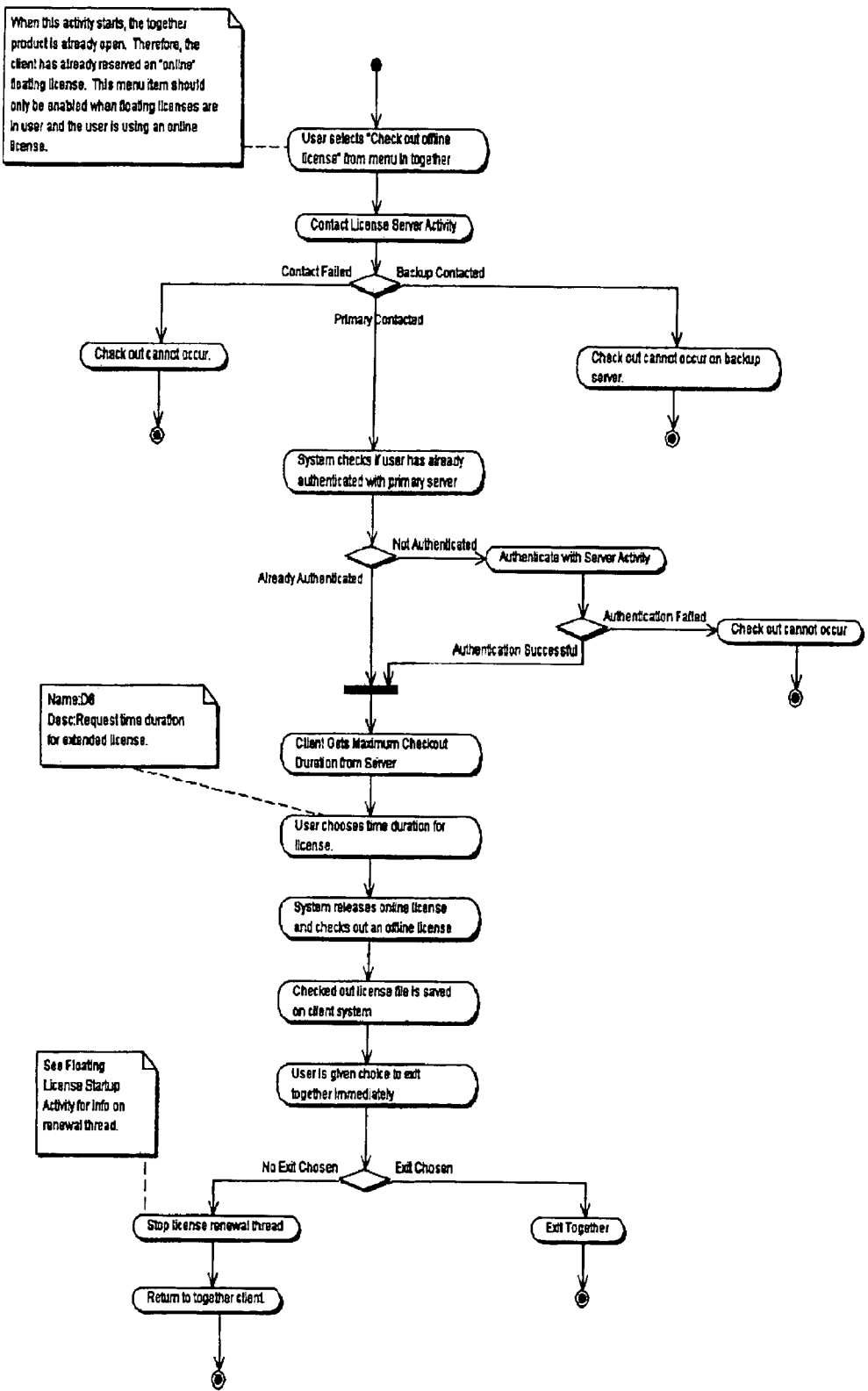
FIG. 1 shows a flow diagram illustrating an exemplary process performed by a data processing system for software license management converting a license in use from a first state to a second state.

The present invention provides an improved license management system and method that permit conversion from a first license state to a second license state of a license for software use on a client computer to permit authorized license use and management thereof while the user and/or client computer is alternately connected and disconnected from a network having a server computer for managing and controlling the authorized use of licensed software. The improved license management system and method permit client computer and user mobility by permitting license use while that computer is either connected or disconnected from the network and server, which continually manages the software licenses, even while the at least one client computer is disconnected from the network. Thus, this system enables the at least one user of the respective at least one client computer to use a license and enjoy mobility while retaining the capacity to use the license. Furthermore, the improved license management system and method permit this mobility and license state conversion without requiring additional licenses to be purchased, i.e., without requiring both a node-locked license and a floating license to be purchased and used to achieve this advantageous result of a multi-state license management system.

Reference will now be made in detail to the description of the invention as illustrated in the drawings. The drawings illustrate an implementation of the invention and, together with the description, serve to explain the advantages and principles of the invention. While the invention is described in connection with these drawings, there is no intent to limit it to the embodiment or embodiments disclosed therein. The present invention and this disclosure is intended cover all alternatives, modifications, and equivalents included within the spirit and scope of the invention set forth herein.

The present invention includes a system for software license management, suitable for practicing methods and systems consistent with the present invention. The system includes a server computer and at least one client computer configured and connected thereto by a computer network. The data processing system embodied in the server computer and the at least one client computer includes a memory, a secondary storage device, an I/O device, and a processor for each computer, including the server computer and each of the at least one client computer. The server computer includes a license management software installed and running thereon. The license management software is capable of identifying licensed software in use for software installed and running on each of the at least one client computer, which is operated by a respective at least one user. The license management software is also capable of identifying and confirming the status for each license, i.e., whether the license is active or inactive at a given time. Additionally, the license management software is capable of identifying a license state for each license installed and running in active status on each of the at least one client computers; the license state may be either a first state, which is a floating license state, or a second state, which is an optionally selectable node-locked or computer-specific license state. The license management software is further capable of comparing a total number of authorized licenses for use of the software on the at least one client computer with a maximum number of authorized users and/or licenses available for use on the at least one client computers simultaneously at any given time. One skilled in the art will recognize that data processing system may contain additional or different components; additionally, the at least one client computer may be connected to the server computer for communicating therewith by a connection other than a hard network connection within the same facility as the server computer, e.g., the connection may be made via the Internet, or the connection may be made by a wireless connection, without departing from the scope of the present invention. Additionally, the at least one client computer may be portable computers, such as laptops, or other computer devices, such as PDAs and the like.

Advantageously, the present invention provides for a convertible floating license having a first state and a second state, wherein the license state may be changed from the first state to the second state for each client computer at the option and by the selection of the respective user of the client computer. Referring now to FIG. 1, the at least one user of the respective at least one client computer establishes a connection with the server computer. At that point, the server checks to determine whether a license for using the software is available; if so, then a first state license is automatically granted to the user of that computer. This method step is repeated for each of the at least one user of the at least one client computer until such time as the total number of licenses in use by the at least one client computer equals the maximum number of available licenses predetermined by a license agreement with the software provider. When the user of the client computer already having the first state license desires to continue using the software under authorized license but would like to disconnect from the network, the user may optionally select to convert the first state license into the second state license and disconnect from the network thereafter while continuing to have authorized access and use of the software without requiring any hardware mechanism or additional software means for license management of the software. More particularly, the optional conversion includes the steps of: receiving the software license or activation of software under license from the server computer after establishing a connection therewith, authenticating the user and/or the client computer, and checking license availability with the server via the license management software on the server computer, which compares the maximum number of users with the actual number of client computers and users connected to the network and running software under license thereby, wherein the license is automatically received in the first state; converting to the second state license by intiating a request for converting the license from the first state to the second state; if available, then the second state license is authorized and received by the requesting client computer. The second state license may be received and checked out on a time-based check out, specifically for a predetermined time period, which may be a maximum period for any license availability where time-based licensing is employed. Alternatively, the user may select the amount of time for which the second state license is deployed or checked out; in this case, the license management software on the server communicates to the client computer and indicates the maximum time for which the second state license may be checked out or used and a prompt will appear on a computer screen or display of the at least one client computer from which the request was made. The user then selects either the maximum time or may enter a predetermined check-out time for the second state license that is less than the maximum time. The user may then exit the system immediately or continue working and exit later. The conversion of the license from the first state to the second state is recorded on the server computer, thereby updating the status of the license, showing the time until expiration or status of the license and the state of the license. The recordation of the status and state of each authorized license is provided on a database, with a corresponding file recorded on the respective client computer; a second record or "snapshot" backup may be recorded to another memory or removable memory storage device for redundancy of license management software records. A timer is provided at the time of license conversion for the activation of the second state license, which is recorded in a file on the client computer and is recorded on the hard drive, memory, or in a database for license management information on the server computer. At the expiration of the predetermined time, either maximum time or predetermined, selected time for the second state license, the file on the client computer is deleted or eliminated automatically and the authorization for the second state license is retracted by the license management software on the server computer, which then automatically frees up a license for another user and client computer to have authorization for a license. These steps are illustrated in FIG. 1, which provides a flow diagram of some of the steps involved in the conversion from a first state license to a second state license.

Figure 2:
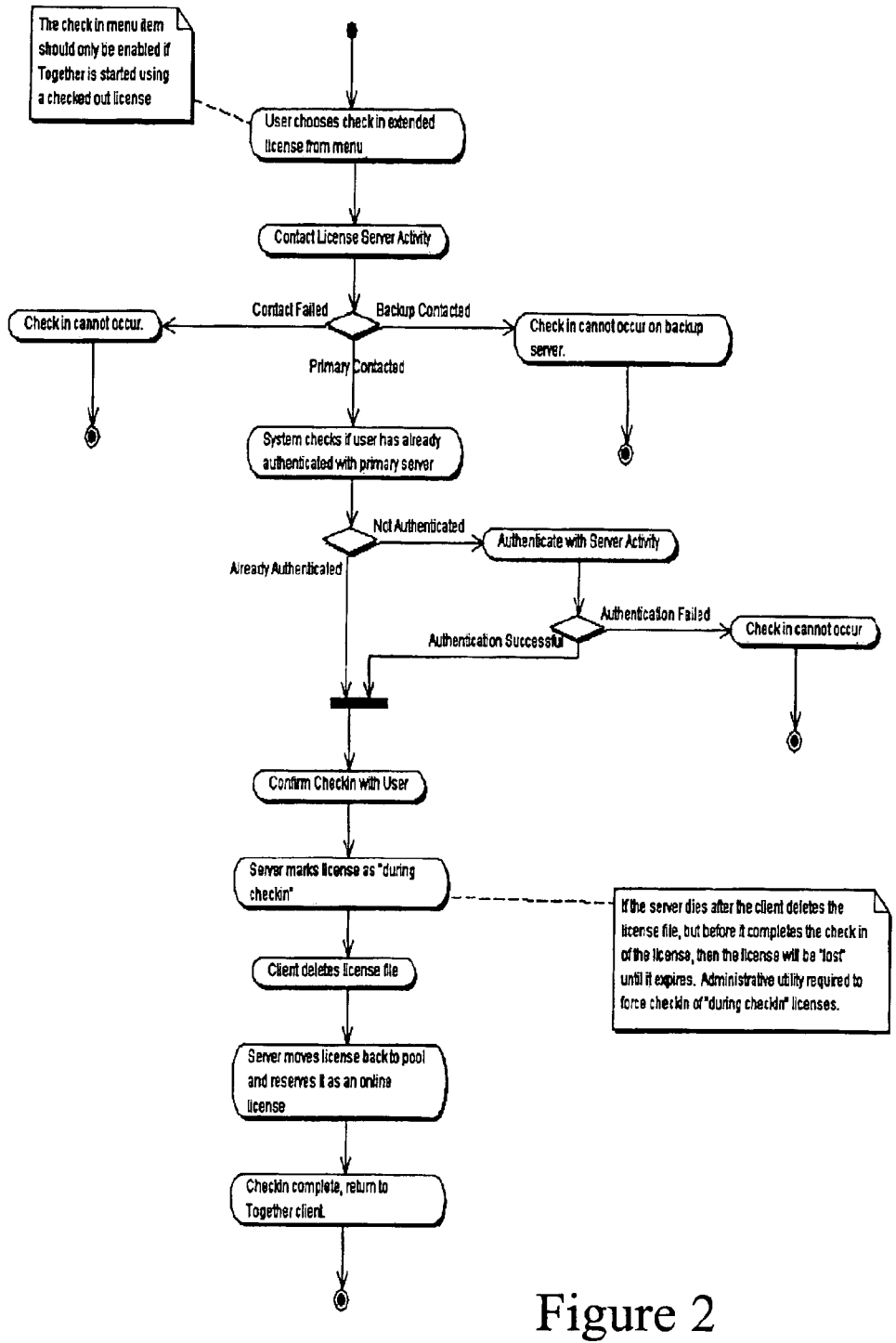
FIG. 2 shows a flow diagram illustrating an exemplary process performed by a data processing system for software license management converting a license in use from a second state to a first state.

Referring now to FIG. 2, the user of the client computer having a second state license is shown at the start of the flow diagram illustration. The method for providing a premature check-in prior to the automatic expiration of the second state license is shown, including the steps of: the user re-establishing a connection with the server computer via the network or other connection; choosing to check in the second state license by making a selection from a menu on the screen or display of the client computer; the client computer contacting the server; the client computer is authenticated with the server; the client computer checking in the second state license; the client computer deleting the license file that was previously created stored on the client computer; the server computer updating the state of the license for the client computer; the server computer converting the license to the first state license. Alternatively, the server computer may prompt the user of the client computer to determine whether the user would like to end the license or continue using the license after it is converted to the first state license; if the user selects to terminate the license, then the server updates the status of the license to so indicate, thereby freeing up the license for another client computer.

Figure 3:
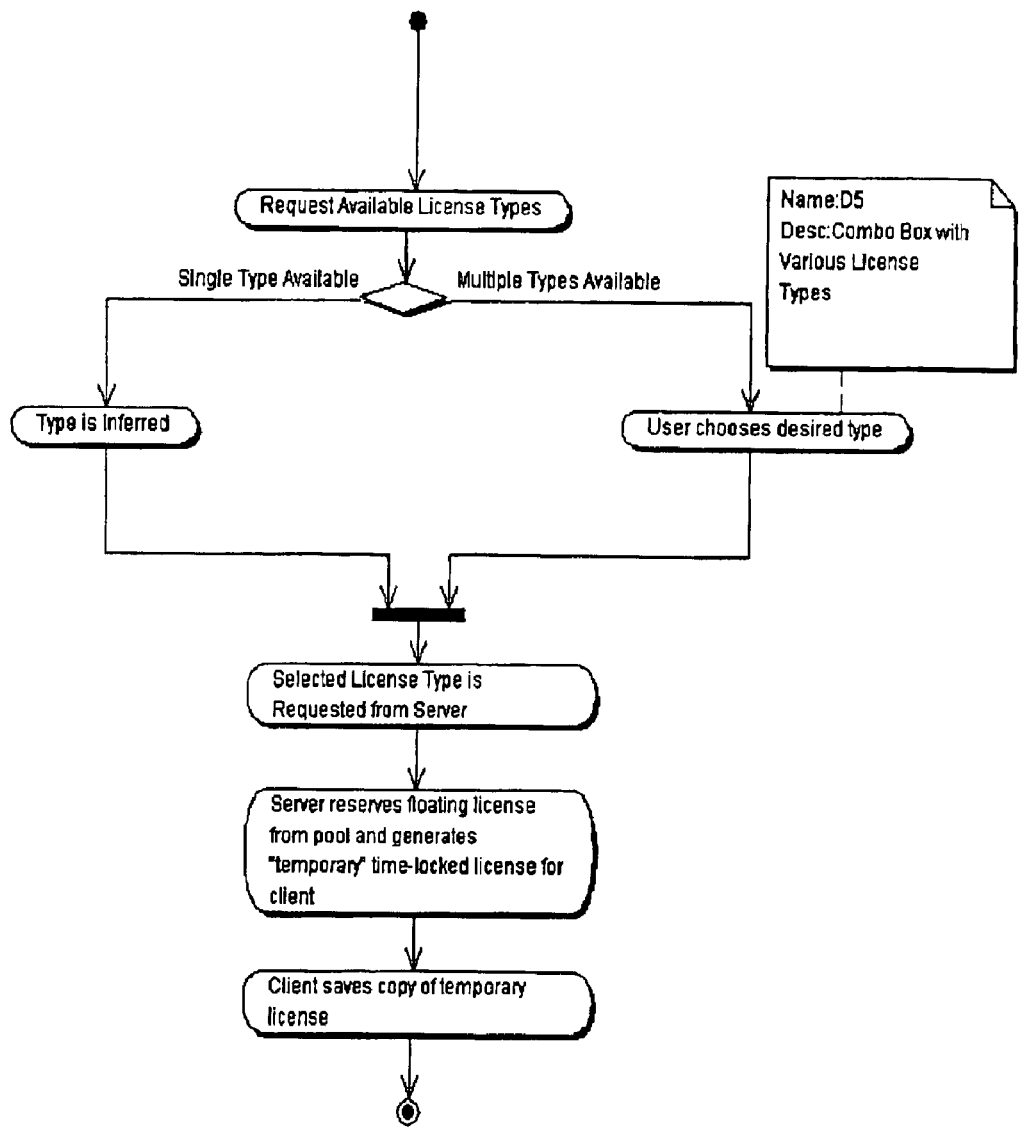
FIG. 3 shows a flow diagram illustrating an exemplary process performed by the system of the present invention for requesting a license from a server computer for use by a client computer.

Referring now to FIG. 3, a flow diagram illustrates the method for a client computer to request whether a license is available upon connecting with the network and authenticating with the server computer. The method includes the steps of: initiating a request for a license; requesting what license types are available for the software desired to be used on the client computer; the server checks the availability of the license from a pool having an available number of licenses under the license agreement with the provider for that software; if another license is available, then the server reserves the license from a pool having an available number of licenses under the license agreement with the provider for that software; the client computer receives the license and a license file is temporarily stored on the client computer; the server computer updates the status and state information on the license for that client computer. Where only one type is available, the type is inferred and that license type is requested from the server; where multiple types are available, a listing of license types is displayed to user of the client computer, who selects the desired license type, which is then requested from the server. It is important to note that the initial license availability may be based on the availability of the first state license for that client computer; where a first state license is already in use on that client computer, then the initial license availability requested is for the second state license.

Furthermore, where a license is not available, the user may be prompted by the server requesting whether the user would like to be listed on a wait list for the next available license or the client computer and/or user may automatically be listed on a wait list for the next available license. If the user does not wish to be optionally listed on the wait list, then the user indicates this by making the appropriate selection that is communicated to the server computer and no addition to the wait list for that user and/or client computer is made. The wait list is generated and stored on the server computer for a predetermined period of time, or until the wait list is modified due to a change in license status or availability, or due to a change in request or a new request from the user of a client computer for a license. When a license becomes available, then the server computer automatically notifies via email or other electronic communication the first or next listed user and/or client computer of the license availability. The user is then prompted to accept or reject the license offered; the user makes a selection and the selection is communicated to the server computer. Where the user selects to receive the available license, then the server computer authorizes the license as set forth in the foregoing; where the option is declined by the user, the server computer updates the wait list and notifies the next listed user and/or client computer and the method steps repeat until the wait list is depleted.

Certain modifications and improvements will occur to those skilled in the art upon a reading of the foregoing description. Although aspects of the license management software system and methods according to the present invention, such as the number of authorized, active users of licensed software on the at least one client computer, are described as being stored in memory on the server computer, one skilled in the art will appreciate that these aspects can also be stored on or read from other types of computer-readable media, in particular for redundancy of the information saved, such as secondary storage devices (e.g., hard disks, floppy disks, or CD-ROM); a carrier wave from a network, such as the Internet; or other forms of RAM of ROM either currently known or later developed. All modifications and improvements have been deleted herein for the sake of conciseness and readability but are properly within the scope of the invention.

We claim:

1. A license management system comprising:
    a data processing system including a server computer, at least one client computer having at least one user;
    a management software for managing a predetermined number of licenses for a licensed software corresponding to the at least one user, the software identifying a status for each license, wherein each license has at least two states including a first state and a second state;
    a connection between the computers being provided via a network for communication between the server computer and the at least one client computer for monitoring and managing the licenses permitted according to the software;
    wherein the first state and the second state are different and selected from a floating state and a node locked state;
    thereby providing automatic management of the at least one user operating at the at least one client computer under the predetermined number of licenses.

2. A license management system comprising:
    a data processing system including a server computer, at least one client computer having at least one user;
    a management software for managing a predetermined number of licenses for a licensed software corresponding to the at least one user, the software identifying a status for each license, wherein each license has at least two states including a first state and a second state;
    a connection between the computers being provided via a network for communication between the server computer and the at least one client computer for monitoring and managing the licenses permitted according to the software;
    wherein the first state is a floating state and the second state in an optionally selected node-locked state.

3. The system according to claim 1, wherein the second state is a node-locked state.

4. The system according to claim 3, wherein the node-locked state is optionally selectable.

5. The system according to claim 1, wherein the at least one user includes at least one authenticated user.

6. The system according to claim 1, wherein the connection is provided via the Internet.

7. The system according to claim 1, wherein the connection is provided by a local area network.

8. The system according to claim 1, wherein the connection is provided by a wide area network.

9. The system according to claim 1, wherein the first state is automatically enabled when the at least one user operates the licensed software.

10. The system according to claim 1, wherein the licensed software is initially in the first state and is convertible into the second state.

11. The system according to claim 10, wherein the number of licenses convertible into the second state is less than the predetermined number of licenses.

12. The system according to claim 11, further including a wait list for users unable to convert to the second state license when the number of convertible licenses is reached.

13. The system according to claim 1, wherein the second state includes a check-in.

14. The system according to claim 1, wherein the second state includes a time limit.

15. The system according to claim 1, wherein the second state includes a time-based check-out.

16. The system according to claim 1, wherein each of the predetermined number of licenses has a time limit for use.

17. The system according to claim 1, wherein the second state is renewable.

18. The system according to claim 1, wherein the second state terminates automatically.

19. A method for managing licensed software comprising the steps of:
    providing a data processing system including a server computer, at least one client computer having at least one user, a management software for managing a predetermined number of licenses for a licensed software corresponding to the at least one user, the software identifying a status for each license, wherein each license has at least two states; a connection between the computers being provided via a network for communication between the server computer and the at least one client computer for monitoring and managing the licenses permitted according to the software;
    authenticating at least one user;
    activating the connection;
    the at least one user receiving a license in a first state of at least two states for use of the licensed software where the number of users is less than the predetermined number of users;
    further including the step of the at least one user converting the first state of the license into a second state of the license,
    wherein the first state and the second state have different restrictions on usage of the software for the at least one user.

20. The method according to claim 19, further including the step of receiving a license in a first state.

21. The method according to claim 19, further including the step of at least one user converting from a first state license to a second state license.

22. The method according to claim 21, further including the step of the at least one user initiating the second state license.

23. The method according to claim 21, further including the step of the at least one user terminating the second state license.

24. The method according to claim 23, further including the step of the at least one user renewing the second state license.

25. The method according to claim 23, wherein the second state license termination is automatic.

26. The method according to claim 23, wherein the second state license termination further includes a check-out.

27. The method according to claim 26, wherein the at least one user retains remaining time available for the license if the check-out occurs prior to a predetermined time limit.

28. The method according to claim 21, wherein the at least one user converts to the second state license using a time-based check-out.

29. The method according to claim 19, wherein the at least two states of each license includes a first state and a second state.

30. The method according to claim 29, wherein the first state is a floating state.

31. The method according to claim 29, wherein the second state is a node-locked state.

32. The method according to claim 31, wherein the node-locked state is optionally selectable.

33. The method according to claim 19, further including the step of the user selecting a second state license that is a node-locked state.

34. The method according to claim 19, further including the step of the management software recording the license status for each of the at least one users.

35. The method according to claim 34, wherein the recording of the license status is recorded on a database with a corresponding file on the client computer corresponding to the user.

36. The method according to claim 34, wherein the recording of the license status includes a snap-shot backup.

37. The method according to claim 19, wherein the management software indicates to the at least one user whether a license is available.

38. The method according to claim 19, wherein the management software indicates to the most recent user of the at least one users that no license is available.

39. The method according to claim 38, wherein the at least one user optionally elects to be waitlisted for a second state license.

40. The method according to claim 39, wherein the at least one user elects to be waitlisted for a predetermined holding period.

41. The method according to claim 38, wherein the at least one user is automatically waitlisted.

42. The method according to claim 19, wherein the at least one user converts to the second state license for a predetermined period.

43. The method according to claim 19, wherein the at least one user converts to the second state license for a user-determined time period.

44. The method according to claim 43, wherein the user-determined time period is a predetermined period.

45. The method according to claim 43, wherein the user-determined time period is less than a maximum period.

* * * * *

UNITED STATES PATENT AND TRADEMARK OFFICE
CERTIFICATE OF CORRECTION

PATENT NO. : 6,915,278 B1
DATED : July 5, 2005
INVENTOR(S) : Ferrante et al.

It is certified that error appears in the above-identified patent and that said Letters Patent is hereby corrected as shown below:

Column 2,
Line 27, "physicalsoally" should be -- physically --.

Column 4,
Line 23, insert the word -- to -- after the word "intended".

Column 10,
Line 23, insert -- Claim 42: The method according to Claim 22, wherein the at least one user converts to the second state license using a time-based check-out. --.

Signed and Sealed this

Twenty-seventh Day of September, 2005

JON W. DUDAS
*Director of the United States Patent and Trademark Office*